United States Patent

[11] 3,598,912

[72] Inventor Antonius Hendrikus Hubertus Jozef Nillesen
Emmasingel, Eindhoven, Netherlands

[21] Appl. No. 10,555
[22] Filed Feb. 11, 1970
[45] Patented Aug. 10, 1971
[73] Assignee U.S. Philips Corporation
New York, N.Y.
[32] Priority Feb. 13, 1969
[33] Netherlands
[31] 6902317

[54] VIDEO AMPLIFIER WITH BLACK LEVEL CONTROL
6 Claims, 2 Drawing Figs.

[52] U.S. Cl. 178/7.3 DC, 178/7.5 DC
[51] Int. Cl. H04n 5/16
[50] Field of Search 178/7.3 DC, 7.5 DC, DIG 26, 330/11

[56] References Cited

UNITED STATES PATENTS 2,851,520 9/1958 Polonsky et al. 178/7.3 DC

*Primary Examiner*—Robert L. Griffin
*Assistant Examiner*—George G. Stellar
*Attorney*—Frank R. Trifari

ABSTRACT: A video amplifier circuit including a black level control circuit wherein a level-shifting circuit and a limiter circuit are incorporated in the control circuit between an output and an input of a video amplifier so as to eliminate the parts of the output signal of the video amplifier which are unimportant for the black level control.

Figure 1:
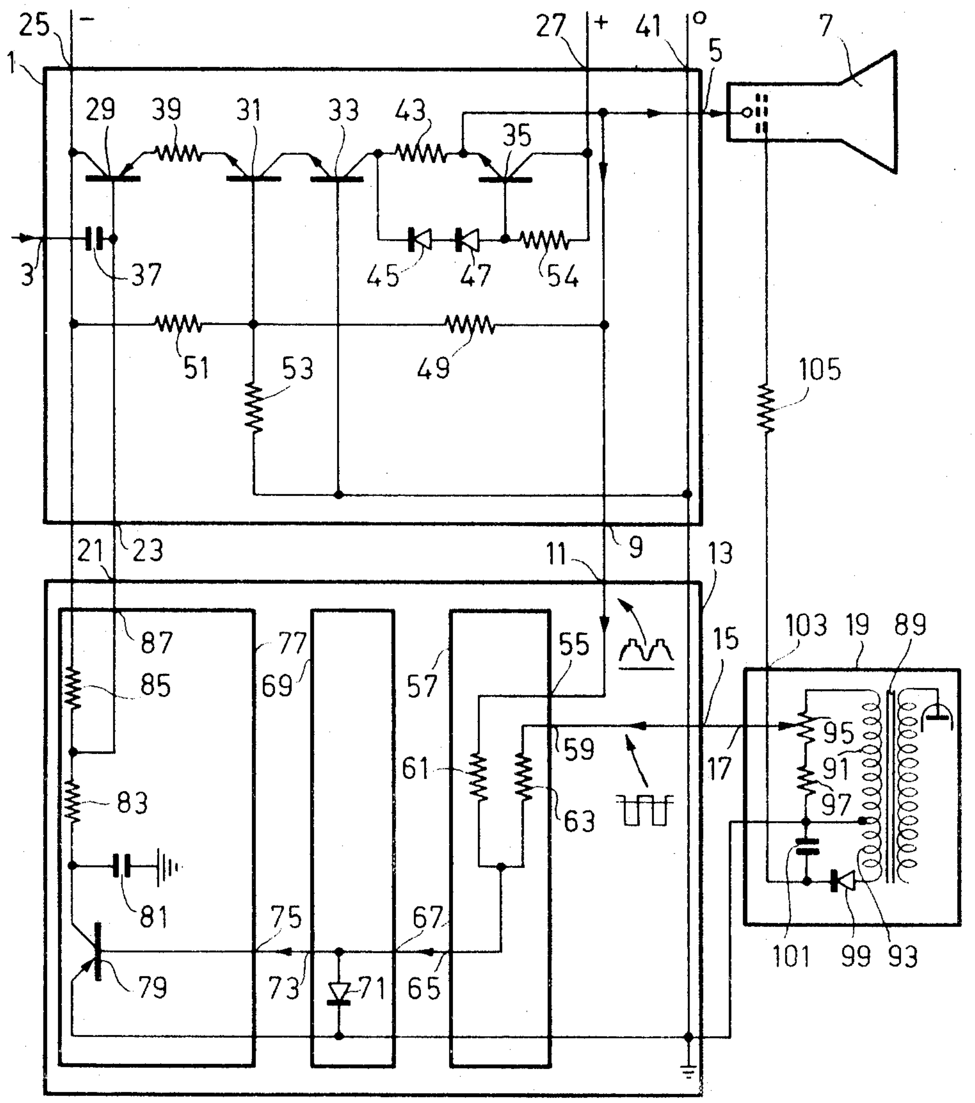

INVENTOR.
ANTONIUS H.H.J.NILLESEN
BY
Frank R. Trifari
AGENT

INVENTOR.
ANTONIUS H.H.J. NILLESEN
BY
AGENT

VIDEO AMPLIFIER WITH BLACK LEVEL CONTROL

The invention relates to a video amplifier circuit for a television picture display device comprising at least one video amplifier which includes an automatic level control circuit employing a time-selective detection device having at least a first input which is connected to an output of the video amplifier, a second input which is coupled to an output of a pulse generator and a level detector having an output which is connected to a level control input of the video amplifier.

A video amplifier circuit of the kind described above is known in which a diode is used as a level detector in the time-selective level detection device and in which the video signal originating from the output of the video amplifier is applied to the cathode, and a pulse originating from the output of the pulse generator is applied to the anode of this diode. For the satisfactory operation of the circuit the amplitude of this pulse must be of the same order as the maximum amplitude of the video signal. The level control signal for the video amplifier is obtained from the anode of the level detector after smoothing. This smoothing must be sufficient to eliminate also the very large pulses at the anode of the level detector. A large time constant is required for this purpose so that such a level control is comparatively slow.

An object of the invention is to eliminate this drawback.

According to the invention a video amplifier circuit of the kind described in the preamble is characterized in that the level detection device comprises a combination circuit and a limiter circuit, a video signal input of said combination circuit being connected to the said first input and a further input being coupled to an output of the pulse generator while an output of the combination circuit is connected to an input of the limiter circuit and an output of the limiter circuit is connected to the level control input of the video amplifier, at least part of the video signal on the same side of the black level as the maximum white level originating from the output of the combination circuit being limited in the limiter circuit.

The invention is based on the recognition of the fact that the difference between the black level in the video signal at the output of the video amplifier and the peak of the pulse signal originating from the output of the time selection pulse generator at the level detector is only small during the actual detection period, so that it is sufficient to apply the difference level between the two signals to the level detector at the lowest possible level during this detection period, and to limit the signal at the level detector during the rest of this period.

In addition to a smaller ripple voltage to be smoothed at the output of the level detector it is furthermore achieved that the voltage at this detector can be maintained small itself, so that this detector can be incorporated in an integrated circuit, if desired.

In order that the invention may be readily carried into effect a few embodiments thereof will now be described in detail by way of example with reference to the accompanying diagrammatic drawings.

Figure 2:
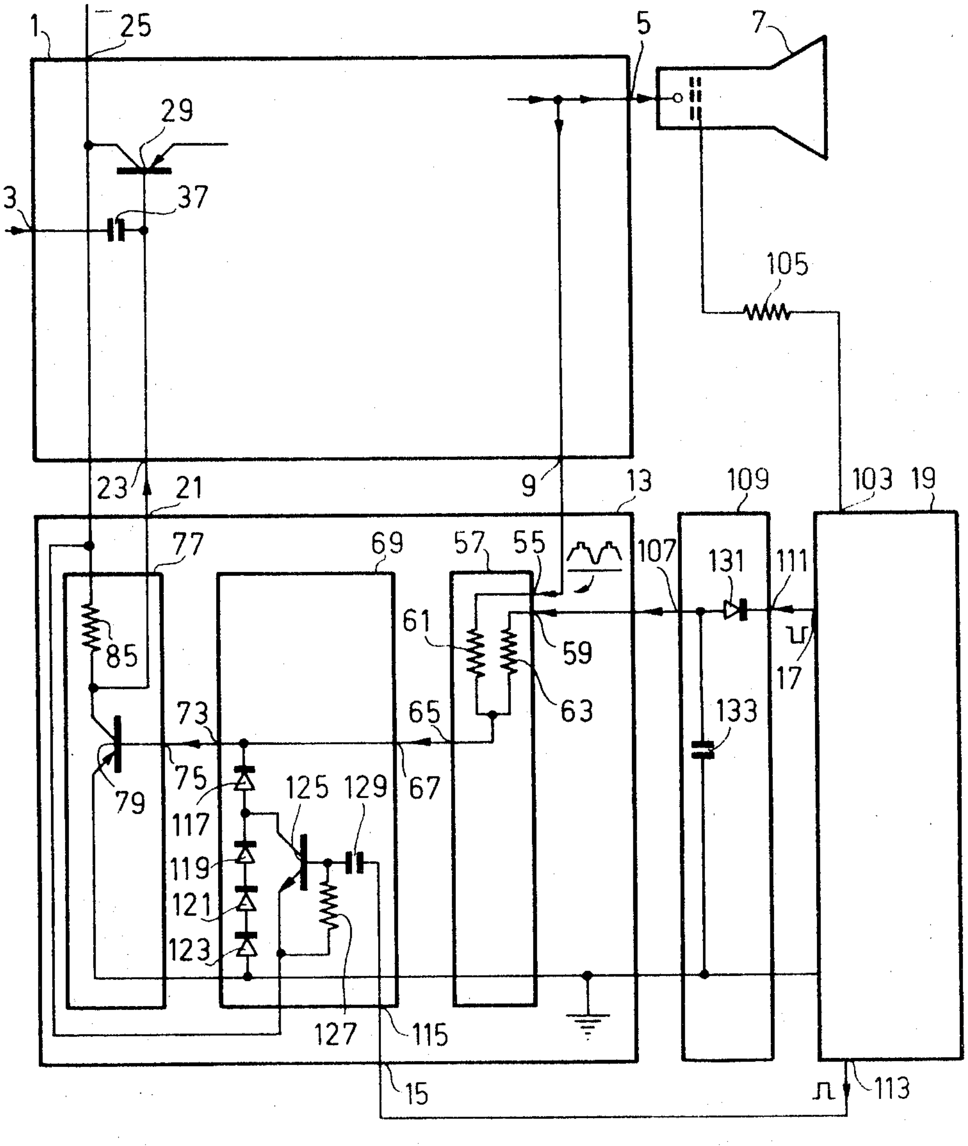

In the drawings in which for the sake of clarity details which are not important for the understanding of the invention are omitted, FIG. 1 illustrates by way of a nondetailed circuit diagram a possible embodiment of a video amplifier circuit according to the invention, FIG. 2 illustrates by way of a nondetailed circuit diagram a further possible embodiment of a video amplifier circuit according to the invention.

In FIG. 1 a video amplifier 1 has an input 3 to which a video signal to be handled is applied. An output 5 of the video amplifier 1 is connected to the cathode of a picture display tube 7. A further output 9 is connected to a first input 11 of a time-selective level detection device 13. A second input 15 of the time-selective level detection device 13 is connected to an output 17 of a pulse generator 19. During the occurrence of a pulse originating from the pulse generator 19 at the second input 15, the level of a reference signal, for example, of the back porch is detected with the aid of the time-selective level detection device 13 in the video signal applied to the first input 11, and is converted into a control signal becoming available at an output 21 of the level detection device 13. The output 21 of the level detection device 13 is connected to a level control input 23 of the video amplifier 1. Consequently, control voltage dependent on the level of the reference signal in the video signal is applied to the control input 23 of the video amplifier 1, which control voltage attempts to maintain this level at the output 9 constant.

The video amplifier 1 comprises four series-arranged transistors 29, 31, 33 and 35 between a negative supply voltage terminal 25 and a positive supply voltage terminal 27. The transistor 29 is a PNP transistor whose collector is connected to the negative supply voltage terminal 25, its base is connected to the level control input 23 and through a capacitor 37 to the input 3 and its emitter is connected through a resistor 39 to the emitter of the transistor 31 which is of the NPN type. The collector of the transistor 31 is connected to the emitter of the transistor 33. The transistor 33 is of the NPN type. The base of this transistor 33 is connected to a connection 41 which is connected to ground and with respect to which the voltages are applied to the supply terminals 25 and 27. The collector of the transistor 33 is connected through a resistor 43 to the emitter of the transistor 35, and through a series arrangement of two diodes 45 and 47 arranged in the pass direction to the base of the transistor 35. The transistor 35 is of the NPN type, its emitter is furthermore connected to the outputs 5 and 9 and through a potential divider comprising a series arrangement of resistors 49 and 51 to the negative supply voltage terminal 25. The connection between the resistors 49 and 51 is connected to the base of the transistor 31 and furthermore through a resistor 53 to the connection 41 which is connected to ground. The collector of the transistor 35 is connected to the positive supply voltage terminal 27 and to its base through a resistor 54.

The transistors 29 and 31 are arranged as a difference voltage amplifier. The alternating voltage component of the video signal to be amplifier is applied to the base of the transistor 29 through the capacitor 37 from the input 3 and the direct voltage component obtained with the aid of the time-selective level detection device 13 is applied from the level control input 23. A negative feedback voltage obtained from the output voltage of the video amplifier with the aid of the potential divider circuit including the resistors 49, 51 and 53 appears at the base of the transistor 31. The output current of the difference voltage amplifier including the transistors 29 and 31 is applied to the emitter of the transistor 33 by the collector of the transistor 31. The current flowing in the collector circuit of this transistor 33 ensures the control of the last transistor 35 arranged as an emitter follower. The connection of the resistor 43 connected to the collector of the transistor 33 shows voltage variations as a result of the control of collector current of the transistor 33, which variations are passed on through the conducting diodes 45 and 47 to the base of the transistor 35, and subsequently to its emitter which provides the output voltage of the video amplifier 1.

The video amplifier 1 does not form part of the invention and in principle any suitable video amplifier may be used.

According to the invention, the first input 11 of the time-selective level detection device 13 is connected to a video signal input 55 of a combination circuit 57 formed as an adder circuit. The second input 15 of the time-selective level detection device 13 is connected to a pulse signal input 59 of the adder circuit 57. The adder circuit 57 includes two resistors 61 and 63 which are arranged in series between the inputs 55 and 59. A junction of the resistors 61 and 63 is connected to an output 65 of the adder circuit 57, which output, 65 is furthermore connected to an input 67 of a limiter circuit 69. The input 67 of the limiter circuit 69 is connected to the anode of a diode 71 and to an output 73. The cathode of the diode 71 is connected to ground. The output 73 of the limiter circuit 69 is connected to an input 75 of a detection circuit 77. The detection circuit 77 includes a PNP transistor 79 the base of which is connected to the input 75, the emitter is connected to ground and the collector is connected to ground through a capacitor 81 and to a negative supply voltage through a series arrangement of two resistors 83 and 85. The connection of the resistors 83 and 85 is connected to an output 87 which is connected to the output 21 of the time-selective detection device 13.

The operation of the time-selective detection device 13 including the adder circuit 57 and the limiter circuit 69 according to the invention is as follows.

A video signal the most positive portion of which falls during the line flyback period and which is formed by the synchronizing signal is applied to the video signal input 55 of the adder circuit 57. This synchronizing signal is flanked by the back porches. Negative flyback pulses are applied to the pulse signal input 59. An adder signal of the video signal and the pulse signal applied to the inputs 55 and 59 appears at the junction of the resistors 61 and 63 and hence at the output 65 of the adder circuit 57. This adder signal would be largely positive in case of a constant load on the output 65 while the back porches from the original video signal would assume minimum signal values as a result of the influence of the negative pulse signal on the adder signal, which values would lie below earth potential. For this purpose, the pulse signal at the input 59 must have a sufficiently high amplitude.

The load on the output 65 of the adder circuit 57 is formed during the positive signal portions by the then conducting diode 71 of the limiter circuit 69. The voltage at the output 65 of the adder circuit can therefore have only very small positive values. In addition these occur outside the back porches which are shifted as regards their level. The level shifted, back porches in the adder signal have a negative value which depends on the level of the back porches in the video signal at the output 9 of the video amplifier 1, and on the amplitude of the pulse signal at the output 17 of the pulse signal generator 19. The limited sum signal having negative going back porches is applied through the output 73 and the input 75 to the base of the transistor 79 which consequently conveys a current during the occurrence of the black level which current is a measure of the value of this black level and is thus dependent on the level of the back porches in the output signal of the video amplifier 1 and on the amplitude of the pulse signal originating from the pulse signal generator 19. The current pulses conveyed by the transistor 79 produce a direct voltage drop in its collector circuit across the resistors 83 and 85 in cooperation with the smoothing capacitor 81 and the coupling capacitor 37, which voltage drop is inter alia, a measure of the location of the black level in the video signal. When applying the direct voltage across the resistor 85 as a level control signal back to the video amplifier 1 through the level control input 23, a control loop action of the video amplifier 1 and the time-selective level detection device 13 is the result which attempts to maintain the black level at the outputs 5 and 9 of the video amplifier 1 constant.

As is apparent from the above, a pulse signal amplitude which is small as compared with the desired signal occurs at the input 75 of the detection circuit 77 as a result of the limitation in the limiter circuit 69, so that the detection circuit may have a smoothing of a fairly short time constant and need only be resistant to low voltages. The latter is favorable in connection with the incorporation of the circuit in an integrated circuit. The short time constant results in a quick matching of the black level in case of changing picture contents.

The pulse signal generator 19 forms part of a line deflection circuit wherein only the portion which is important for the understanding of the circuit is shown in the drawing. The line time base circuit including the pulse generator 19 comprises a line deflection transformer 89 having two secondary windings 91 and 93 which are connected to ground at the common end. The other end of the winding 91 is connected to a series arrangement of a potentiometer 95 and a resistor 97. The other end of the resistor 97 is connected to ground. The wiper on the potentiometer 97 is connected to the output 17 of the pulse generator 19. The other end of the winding 93 is connected to the anode of a diode 99. The cathode of the diode 99 is connected to a capacitor 101 whose other end is connected to earth and to an output 103 of the pulse generator 19. The output 103 is connected through a resistor 105 to a screen grid of the picture display tube 7.

The winding 91 of the line deflection transformer 89 produces negative line flyback pulses at the potential divider 95,97. These pulses are applied with an amplitude which is adjustable with the aid of the potentiometer 95 to the wiper on the potentiometer 95 and hence to the output 17 of the pulse generator 19. The amplitude of these pulses exerts influence on the magnitude of the current pulses conveyed by the transistor 79 in the detection circuit 77 and hence on the control signal applied to the level control input 23 of the video amplifier 1, which control signal determines the level of the back porch in the output signal of the video amplifier and hence the background brightness of the picture reproduced by the display tube 7. The picture brightness is thus adjustable with the aid of the potentiometer 95.

The diode 99 and the capacitor 101 form a rectifier circuit by means of which positive line flyback pulses originating from the winding 93 are rectified and converted into a direct voltage which is applied through the output 103 and the resistor 105 to the screen grid of the display tube 7. In case of a possible variation of the amplitude of the line flyback pulses transmitted by the transformer 89, the amplitude of the pulses applied to the output 17 will vary as well as the direct voltage at the output 103 by which the screen grid of the picture display tube 7 is fed. As a result the cathode voltage and the screen grid voltage of the picture display tube 7 vary. In case of a correct proportioning of the components of the circuit, the background brightness of the picture displayed can then remain substantially constant. This is especially important in color television picture display devices wherein the mutual ratios of the currents in the different electron gun systems of the picture display tube must remain constant as much as possible so as not to produce variations in hue in the picture displayed. The resistor 105 in the screen grid line of the picture display tube 7 provides a negative feedback which maintains the background brightness and the hue in color television picture display devices constant in case of voltage variations of the filament supply of the picture display tube 7.

A very simple combination of a combination circuit formed as an adder circuit, a limiter circuit and a detection circuit was given in the above embodiment. It will be evident to those skilled in the art that different combinations of these partial circuits according to the invention can be composed with reference to the above and which have the same favorable effect. The combination circuit may alternatively be formed as a difference voltage circuit instead of an adder circuit. The polarities of the signals applied thereto must then be adapted.

In general the output 17 of the pulse generator 19 will be connected through a limiter circuit to the wiper on the potentiometer 95 so as to prevent rapid variations in the pulse amplitude from occurring at the input 59 of the adder circuit 57. This limiter circuit then has preferably a self-adjusting limitation level which ensures that variations around the mean pulse amplitude of the signal originating from the winding 91 are passed on to the input 59 of the adder circuit 57. Such a circuit requires fairly much energy and may be omitted in the embodiment of FIG. 2.

In case of a sufficient amplification in the control loop, it is possible to omit the transistor 79 and to connect the level control voltage input 23 of the video amplifier 1 directly to the output 73 of the limiter circuit 71 through a smoothing filter. The combination of the limiter circuit 69 and this smoothing filter then serves as a level detector.

In FIG. 2 the same reference numerals as those in FIG. 1 are used for corresponding components. For the description thereof, reference is made to the description to FIG. 1.

The paramount differences from FIG. 1 are the following.

The further input 59 of the adder circuit 57 is connected to an output 107 of a rectifier circuit 109 an input 111 of which is connected to the output 117 of the pulse generator 19. The second input 15 of the time-selective level detection device 13 is connected at one end to an output 113 of the pulse generator 19 and at the other end to a level influence input 115 of the limiter circuit 69. The limiter circuit is furthermore built up in a manner differing from that in FIG. 1.

A series arrangements of four diodes 117, 119, 121 and 123 is included in the limiter circuit 69 between the input 67 and ground. The cathode of the diode 117 is connected to the input 67 and the output 73 of the limiter circuit 69. The anode of the diode 123 is connected to ground. The connection between the anode of the diode 117 and the cathode of the diode 119 is connected to the collector of an NPN transistor 125. The base of this transistor is connected through a resistor 127 to the emitter thereof which is connected to a negative supply voltage. The base of the transistor 125 is furthermore connected through a capacitor 129 to the level influence input 115.

The rectifier circuit 109 includes a diode 131 whose cathode is connected to the input 111 and whose anode is connected to the output 107 of the rectifier circuit 109. The anode of the diode 131 is furthermore connected to ground through a smoothing capacitor 133.

The detection circuit 77 does not include an additional smoothing filter. The coupling capacitor 37 of the video amplifier 1 serves as a smoothing capacitor. The input 3 of the video amplifier 1 must then be controlled by a source having a low output impedance.

The operation of the circuit is as follows.

Negative line flyback pulses are applied to the input 111 of the rectifier circuit 109. These pulses produce a negative direct voltage at the output 107 which voltage is passed on to the input 59 of the adder circuit 57. A video signal appears at the input 55 of the adder circuit 57. This video signal is composed together with the negative direct voltage to form a signal at least the black level of which lies below the zero level. This signal causes the diodes 117, 119, 121 and 123 to conduct through the output 65 of the adder circuit 57 and the input 67 of the limiter circuit 69, so that it is substantially not possible for any negative going output voltage to be produced at the output 73 of the limiter circuit 69. In this case it is assumed that the transistor 125 is cut off. This is the case during the line scan. During the line flyback the transistor 125 is bottomed by a positive pulse originating from the output 113 of the pulse generator 19, which pulse is applied through the capacitor 129 to the base of the transistor 135. A voltage which is negative relative to ground then develops across the diodes 119, 121 and 123. The diode 117 is then blocked. The input voltage of the limiter circuit is then applied through the output 73 to the input 75 of the detection circuit. This input voltage includes the shifted black level from the video signal. A control voltage which is applied to the level control input 23 of the video amplifier 1 is now derived from this passed-on signal in the detection circuit 77.

The circuit has the advantage that pulses of small amplitude can be applied to the level influence input 115 of the limiter circuit 69 so that little energy is withdrawn from the time selection pulse generator 19. Also the rectifier circuit 109 requires only little energy.

I claim:

1. A video amplifier circuit for a television picture display device comprising at least one video amplifier which includes an automatic level control circuit employing a time-selective level detection device having at least a first input which is connected to an output of the video amplifier, a second input which is coupled to an output of a pulse generator and a level detector having an output which is connected to a level control input of the video amplifier, characterized in that the level detection device comprises a combination circuit and a limiter circuit, a video signal input of said combination circuit being connected to the said first input and a further input being coupled to an output of the pulse generator while an output of the combination circuit is connected to an input of the limiter circuit and an output of the limiter circuit is connected to the level control input of the video amplifier, the output of the combination circuit is the sum of the video and pulse signals supplied thereto whereby; at least part of the video signal on the same side of the black level as the maximum white level originating from the output of the combination circuit is limited in the limiter circuit.

2. A video amplifier circuit as claimed in claim 1, characterized in that the further input of the combination circuit is connected to the said second input of the level detection device, a pulse signal originating from the output of the pulse generator being combined in the combination circuit with the video signal fed to the video signal input at such an amplitude and polarity that the level to be detected in the level detection device in the combined signal at the output of the combination circuit occurs on the other side of the maximum white level in the video signal than the black level does.

3. A video amplifier circuit as claimed in claim 2, characterized in that the combination circuit is an adder circuit which includes series-arranged resistors between a terminal of the said video signal input and a terminal of the said further input, the junction of said resistors being connected to the input of the limiter circuit.

4. A video amplifier circuit as claimed in claim 3, characterized in that the said junction of the series arrangement is connected at one end through a diode in the limiter circuit and at the other end through a base-emitter junction of a transistor incorporated in the level detection circuit, which base-emitter junction has a direction of conductivity which is opposite to the diode, while the collector of the said transistor is connected to the output connected to the level control input of the video amplifier.

5. A video amplifier as claimed in claim 1, characterized in that the further input of the combination circuit is connected through a rectifier circuit to an output of the pulse generator and that the second input of the time-selective level detection device is connected to an input of the limiter circuit which has a level of limitation which is dependent on a signal at the second input.

6. A video amplifier circuit as claimed in claim 5, characterized in that the input of the limiter circuit connected to the output of the combination circuit is connected to the output of the limiter circuit and is connected to ground through a series arrangement of a plurality of diodes, while the other end of the diode connected to the input and the output of the limiter circuit is also connected to the collector of a transistor the base of which is connected to the input of the limiter circuit which input is connected to the output of the pulse generator.